Figure 1:
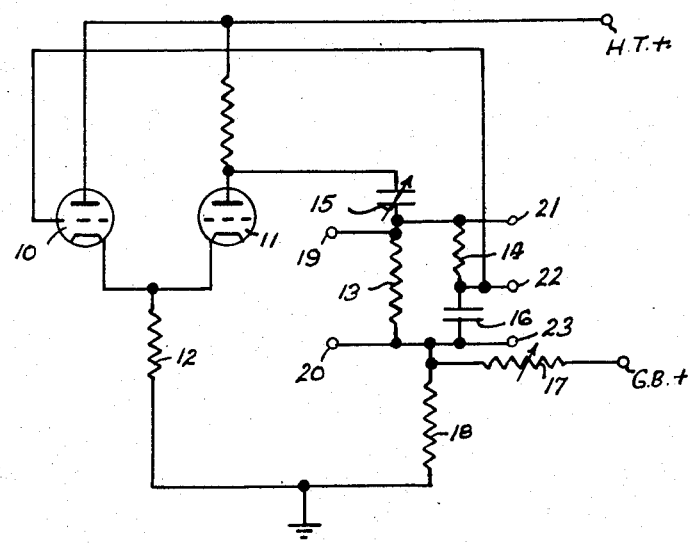

May 29, 1956     R. BEAUFOY     2,748,285
START-STOP OSCILLATOR
Filed March 27, 1950     3 Sheets-Sheet 1

Inventor
Raymond Beaufoy
By Ralph B. Stewart
attorney

May 29, 1956 R. BEAUFOY 2,748,285
STAR-STOP OSCILLATOR
Filed March 27, 1950 3 Sheets-Sheet 2

Inventor
Raymond Beaufoy
By Ralph B. Stewart
attorney

United States Patent Office 2,748,285
Patented May 29, 1956

2,748,285
START-STOP OSCILLATOR

Raymond Beaufoy, Taplow, England, assignor to British Telecommunications Research Limited, Buckinghamshire, England, a British company Application March 27, 1950, Serial No. 152,249

Claims priority, application Great Britain April 5, 1949

5 Claims. (Cl. 250—36)

The present invention relates to electric oscillation generators.

A requirement frequently arises, for example in radar or echo-sounding apparatus and test apparatus for measuring distortion in certain kinds of telegraph signals, for an oscillation generator adapted to be started and stopped in response to the application of control signals. Such oscillators are usually known as start-stop oscillators. In the case of radar and echo-sounding, for example, it may be required to start a time base on the transmission of an exploring pulse and to stop the time base on receipt of an echo signal, or at a predetermined instant of time after the transmission of the exploring pulse. In the case of test apparatus for measuring distortion in telegraph signals, the signals may be those used to operate a teleprinter. For reliable operation of a teleprinter the duration of each "mark" or "space" signal must lie within predetermined limits. The test apparatus may function by causing a time base to start at the commencement of a teleprinter signal and to stop at the end of the signal. In this way the duration of the signal can be measured and distortion therein readily ascertained.

In order to meet these requirements it has been proposed to provide an oscillator comprising an amplifier, an oscillatory circuit including an inductance coil and a capacity, and a suitable feedback arrangement. Before the arrival of a signal a direct current is passed through the coil from a low impedance source. It is arranged that the arrival of the signal causes this current to be cut off and the electromagnetic energy stored in the coil sets the oscillator immediately into oscillation. The oscillations may be of constant amplitude or of diminishing amplitude dependent upon the gain of the amplifier. It is arranged that the cessation of the signal causes the direct current to flow once more through the coil, and as the low impedance source shunts the oscillatory circuit, the heavy damping thereby applied stops the oscillator within about one cycle of oscillation.

This proposed arrangement is also adapted to provide two outputs differing in phase from one another by 90° by connecting a resistor in series with the capacitor. The voltages developed across the resistor and capacitor respectively are then displaced 90° relatively to one another.

The two outputs may then be used to provide a circular or spiral time base depending upon the gain of the amplifier.

It is the object of the present invention to provide an improved start-stop oscillator whose frequency and amplitude of oscillation can readily be made more stable than that of the aforesaid proposed arrangement, which can provide two outputs phase-displaced 90° relatively to one another without the need for components other than those necessary to generate the oscillations, and which is such that it can be stopped substantially immediately, that is to say in considerably less than one cycle after the application of a stop signal.

A further object of the invention is to provide an improved start-stop oscillator in which inductance elements need not be used.

According to the present invention, a start-stop oscillator comprises a directly-coupled resistance-capacity oscillator having means for controlling regenerative feedback in the oscillator and normally substantially preventing the application of regenerative feedback, the control means being adapted to permit the abrupt application of a substantial amount of regenerative feedback in response to a start signal, abruptly to reduce the regenerative feedback to substantially zero in response to a stop signal, and to provide a predetermined datum potential at the output of the oscillator when the control means are in the condition of substantially preventing the application of regenerative feedback. The control means may serve normally to provide substantially a short-circuit of the regenerative feedback circuit and may remove the short-circuit in response to a start signal and reimpose the short-circuit in response to a stop signal. On the other hand the control means may normally provide substantially an open-circuit in series with the regenerative feedback circuit and may remove the open-circuit in response to a start signal and reimpose the open-circuit in response to a stop signal. By resistance-capacity oscillator is meant an oscillator comprising an amplifier having a regenerative feedback circuit including a phase-determining resistance-capacity network. By direct coupling is meant coupling which incorporates no series capacitance in intervalve couplings and in the connection or connections between the phase-determining network and the input of the amplifier.

As is well known a resistance-capacity oscillator can readily be made highly stable, two outputs differing in phase by 90° may conveniently be taken from two suitable components in the phase-determining resistance-capacity network of the oscillator, and, unlike the aforementioned proposed arrangement in which the oscillator is stopped by damping, the oscillator is stopped by making an abrupt change in the characteristics of the phase-determining resistance-capacity network by short-circuiting or open-circuiting the network.

Figure 2:
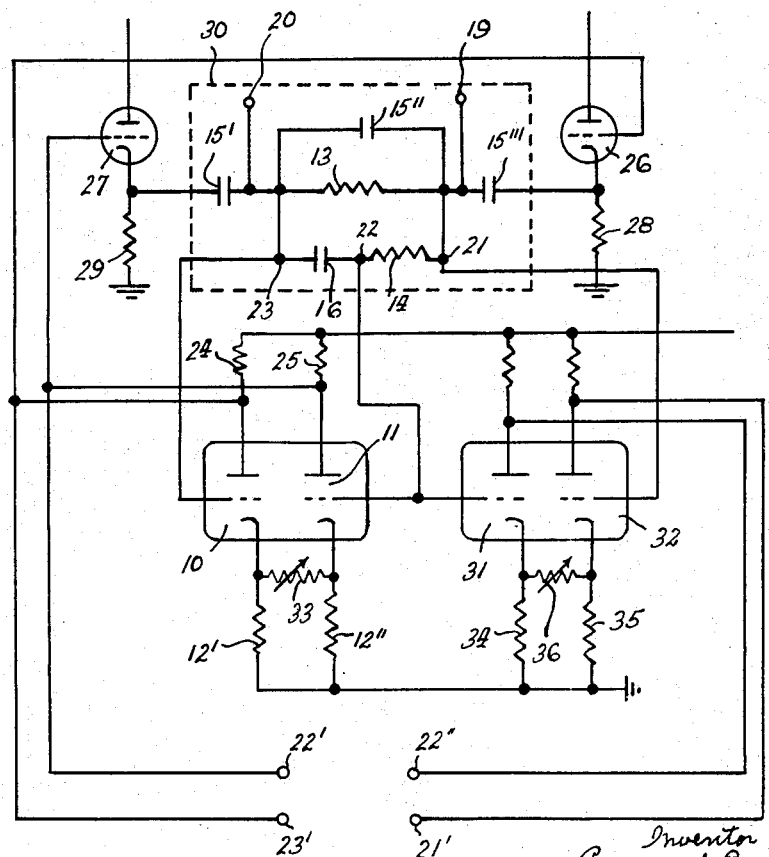
Figure 3:
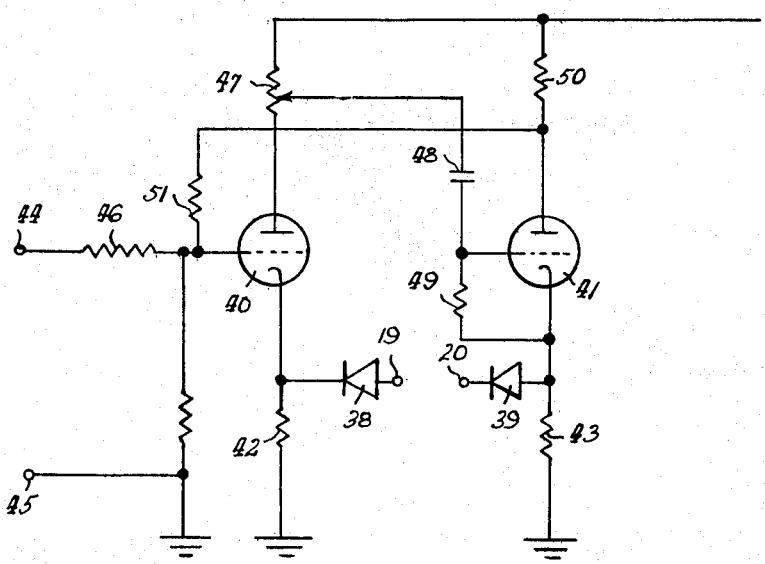
Figure 4:
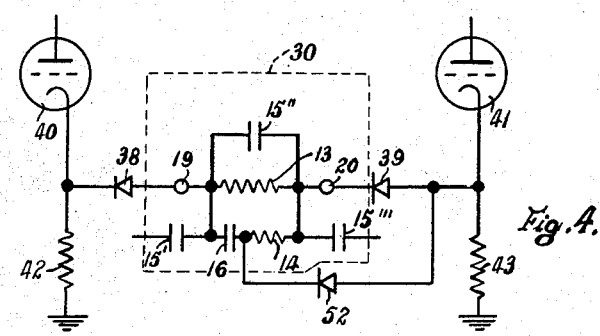
Figure 5:
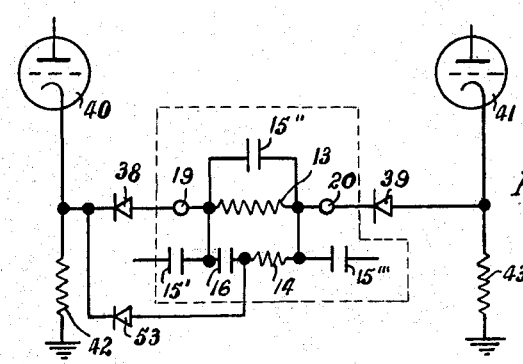
Figure 7:
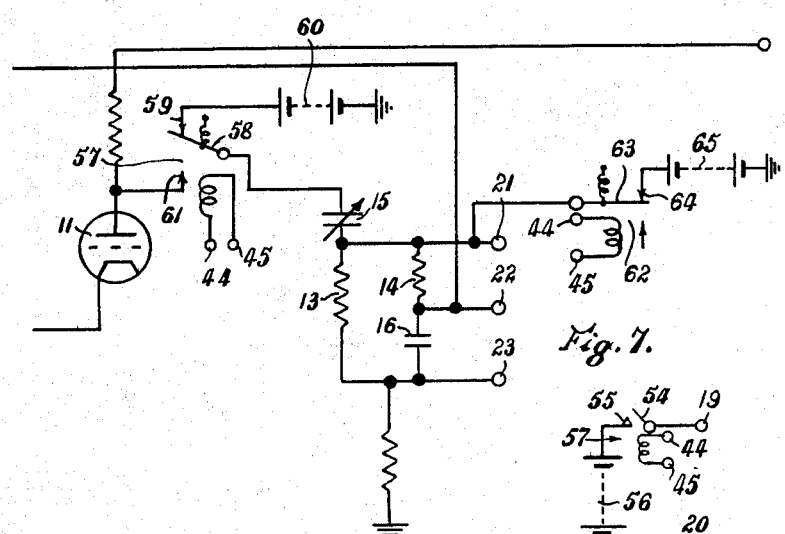
Figure 6:
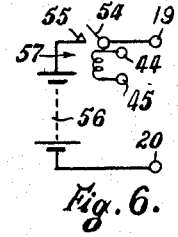

The invention will now be described, by way of example, with reference to the accompanying drawings, in which Figure 1 is a theoretical circuit diagram of part of a simple oscillator according to the invention, Figure 2 is a theoretical circuit diagram of part of a second oscillator according to the invention, Figure 3 is a theoretical circuit diagram of a control circuit suitable for use in conjunction with either of the arrangements of Figures 1 and 2, Figures 4 and 5 are circuit diagrams of modifications of the arrangement shown in Figure 3, and Figures 6 and 7 are theoretical circuit diagrams of alternative control circuits.

In Figure 1 an amplifier comprising two valves 10 and 11 directly-coupled by means of a common cathode resistor 12, has a regenerative feedback circuit including a phase-determining network comprising two resistors 13 and 14 and two capacitors 15 and 16. The phase-determining network is of a known kind and provides zero phase-shift at a predetermined frequency at which the circuit oscillates, the phase-shift of the amplifier itself being substantially zero. The frequency of oscillation may be varied by varying both capacitors 15 and 16 or both resistors 13 and 14, and it may conveniently be arranged to vary the resistors in steps to provide different ranges and to vary the capacitors continuously to provide adjustment within each range. The anode of the valve 11 is connected directly to the capacitor 15 and the junction of the resistor 14 with the capacitor 16 is connected directly to the control grid of the valve 10. In this way all coupling capacitors are avoided. In order to apply a suitable bias to the control grid of the valve 10 a potential divider is provided including a variable resistor 17 and fixed resistor 18 the latter being connected in series in the feedback circuit and the resistor 17 being connected to the positive terminal GB+ of a suitable source of voltage whose negative terminal is earthed. By varying the resistor 17 the bias between the control grid and cathode of the valve 10 may be given a desired magnitude.

In operation a low impedance may be connected between the terminals 19 and 20 through a switch which opens in response to a start signal and closes in response to a stop signal. In this way, before the arrival of the start signal, the feedback path is short-circuited, and the short circuit is removed by a start signal and reinstated by a further stop signal. A suitable circuit arrangement for performing the function of the switch and low impedance will be described later. It will be appreciated that the switch could be placed, for example, in series between the anode of the valve 11 and the capacitor 15 and adapted to open in response to a stop signal and close in response to a start signal.

Two outputs differing in phase by 90° are made available across the resistor 14 and capacitor 16 respectively, output terminals 21, 22 and 23 being provided. The two output voltages may be applied to the beam deflecting plates of a cathode ray tube and by suitable adjustment of the gain of the amplifier a circular or spiral trace may be produced on the screen of the cathode ray tube. Furthermore each trace may be arranged to start from a predetermined datum position by applying a steady datum voltage to the terminals 19 and 20 automatically whenever the low-impedance is connected thereto.

With the arrangement of Figure 1 the outputs may contain second harmonic components and the datum potentials of the two outputs may vary. The effect of the latter may be obviated by passing the two outputs through transformers. In this case, however, the aforesaid datum voltage is not transmitted to the secondary windings of the transformers.

In order to remove both of these defects an arrangement as shown in Figure 2 may be used. In this figure the output of the amplifier comprising the valves 10 and 11 is arranged to be in push-pull by providing output resistors 24 and 25 in the anode circuits of both valves respectively. The anode of the valve 10 is connected directly to the control grid of a triode valve 26 and the anode of the valve 11 is connected directly to the control grid of a triode valve 27. The valves 26 and 27 have cathode load resistors 28 and 29 respectively and voltages are produced across the resistors 28 and 29 in phase with the voltages at the anodes of the valves 10 and 11 respectively. The object in using the cathode follower valves 26 and 27 is to provide low impedance inputs to the phase-determining network shown within a broken line 30. This phase-determining network is a development of that shown in Figure 1. It will be seen that the capacitor 15 of Figure 1 is replaced by three capacitors 15′, 15″ and 15‴. In this way the direct component of voltage across the resistors 29 and 28 is prevented from reaching the control grids of the valves 10 and 11, and the three capacitors 15′, 15″ and 15‴ form a potential divider determining the magnitude of the voltage appearing across the resistor 13.

The push-pull output from the valves 10 and 11 is taken to output terminals 22′ and 23′. In addition a further pair of valves 31 and 32 arranged in push-pull is connected to amplify the voltage appearing across the resistor 14 and to provide a push-pull output to terminals 21′ and 22″.

With this circuit arrangement the output voltages differing in phase by 90° and appearing between the pairs of terminals 22′, 23′ and 21′, 22″ respectively, can be made substantially free from second harmonic content and of a fixed datum potential.

It will be understood that the amplifier 10, 11 performs the two functions of maintaining oscillations and providing an amplified output. These two functions could equally well be performed by separate amplifiers.

A convenient arrangement for controlling the gain of the amplifiers 10, 11 and 31, 32 is shown in Figure 2. It will be seen that the coupling resistor 12 of Figure 1 is replaced by two resistors 12′ and 12″ connected in the cathode leads of the two valves 10 and 11 respectively. The cathodes are connected through a variable resistor 33 and variation of this resistor changes the gain of the amplifier. A like arrangement is used in conjunction with the valves 31 and 32, these valves having resistors 34 and 35 connected in their cathode leads and having their cathodes connected through a variable resistor 36.

During positive half-cycles of the oscillations on the control grids of the valves 10, 11, 31 and 32, grid current flows charging the capacitors 15′ and 15‴. In this way automatic bias is provided for the valves 10, 11, 31 and 32. It is arranged that the discharge time constant of the capacitors 15′ and 15‴ is many times the period of oscillation.

The frequency of oscillation is such that $\omega^2 C_1 C_2 R_1 R_2 = 1$ where $\omega^2 = (2\pi f)^2$, $f$ being the frequency of oscillation, $C_1$ is the total capacitance of the capacitors 15′, 15‴ in series added to the capacitance of the capacitor 15″, $C_2$ is the capacitance of the capacitor 16, $R_1$ is the resistance of the resistor 13 and $R_2$ is the resistance of the resistor 14. Frequency variation may conveniently be effected by varying $C_1$ and $C_2$ simultaneously, and as in Figure 1 it may be arranged to vary $R_1$ and $R_2$ in steps and to vary $C_1$ and $C_2$ continuously. On the other hand it may be preferred to use the variation of $R_1$ and $R_2$ for fine frequency adjustment and to adjust the capacitors in steps.

Referring to Figure 3 this shows a convenient arrangement for starting and stopping the oscillators shown in Figures 1 and 2. The terminals 19 and 20 are connected through two rectifiers 38 and 39 respectively to the cathodes of two triode valves 40 and 41. The cathode leads of these two valves contain resistors 42 and 43 respectively and it is arranged, as will be described later, that on the application of a start signal the anode current in the valve 41 is cut off and that the valve 40 is conducting. The potential of the cathode of the valve 40 becomes more positive than the cathode of the valve 41. The rectifiers 38 and 39 are then insulating and hence the impedance presented by the start-stop circuit to the terminals 19 and 20 is almost infinite. The oscillator therefore oscillates. When a stop signal is applied, it is arranged that the anode current in the valve 40 is cut off and that the valve 41 conducts. The potential of the cathode of the valve 41 becomes more positive than that of the valve 40 and hence the rectifiers 38 and 39 conduct and a low impedance is presented by the start-stop circuit to the terminals 19 and 20. The oscillator then stops oscillating.

The manner in which the start-stop circuit is arranged to produce this result may be as follows. The start-stop signals are applied to input terminals 44 and 45 of which 44 is connected to the control grid of the valve 40 through a resistor 46, and 45 is earthed. It is arranged that a start signal gives the potential of the terminal 44 a high positive value and a stop signal gives the terminal 44 a high negative value. It is convenient, for example, to derive the start and stop signals from the tongue of a telegraph relay whose fixed contacts are at, say +80 and −80 volts respectively relatively to earth.

On applying a start signal the control grid of the valve 40 is driven highly positive and hence the anode current rises rapidly to a high value. This rapid rise in anode current causes a rapid fall in the potential of the anode of the valve 40 because of the voltage drop across a load resistor 47. A capacitor 48 is charged from a tapping on the resistor 47 through a resistor 49 and the cathode resistor 43. The control grid of the valve 41 therefore becomes negative and it is arranged that this control grid becomes sufficiently negative rapidly to cut off the anode current of the valve 41. This rapid fall in the anode current of the valve 41 causes the potential of the anode of this valve to rise rapidly as the voltage drop across an anode load resistor 50 falls. This rise in potential is fed back to the control grid of the valve 40 through a resistor 51. The action taking place is, therefore, cumulative and the transition from stop to start can be made extremely rapid.

The charge in the capacitor 48 leaks away at a rate determined mainly by the values of the capacitor 48, and resistor 49, and by the setting of the adjustable tap on the resistor 47. After a predetermined time interval which may be varied by changing the tapping on the resistor 47, the valve 41 therefore becomes conducting. The potential on the control grid of the valve 40 is still highly positive, however, and the rectifiers 38 and 39 remain insulating.

On the application of a stop signal the control grid of the valve 40 is driven highly negative cutting off the anode current of this valve. The rectifiers 38 and 39 therefore conduct immediately and render the oscillator quiescent.

In addition to starting and stopping the oscillator, the circuit of Figure 3 performs a further function of providing a datum voltage at the terminals 19 and 20 during stop periods. All potentials in the phase-shift network of the oscillator are determined, during stop periods, by this datum voltage, and on the application of the start signal these potentials start varying sinusoidally from their datum values. This results in the potentials of the terminals 21′, 22′, 22″ and 23′ of Figure 2 having datum values during stop periods. These datum potentials may be used to fix the spot on a cathode ray tube screen at a datum position from which each trace commences. The magnitude of the datum voltage may be varied in any suitable manner, for example by connecting a variable resistor between the cathodes of the valves 40 and 41 and varying the value thereof, see Figure 3.

The phase determining network 30 of Figure 2 may, of course, take other forms. For example, the capacitor 15″ may be omitted provided suitable adjustment is made in the values of capacitors 15′ and 15‴.

The provision of the datum potential is made possible by the use of direct coupling in the amplifier and avoiding series capacitors in the connection or connections between the resistance-capacity network and the input of the amplifier in the arrangements of Figures 1 and 2. The datum potential may be made equal to the amplitude of the oscillations developed across the capacitor 16, whereby on the application of a start signal the oscillation across the capacitor starts at its maximum value. It will be understood that the potential difference across the resistor 14 is zero when the capacitor 16 is charged to the datum potential and hence the two outputs from the oscillator start immediately in correct phase relationship, that is to say 90° out of phase. It will be understood that if series capacitors were used in the intervalve couplings and in the connection or connections between the network and the amplifier, the output datum potential would change as the capacitors discharge after the application of a stop signal.

Figures 4 and 5 show modifications of the arrangement of Figure 3. In Figure 4 the modification consists of the connection of a third rectifier 52 connected between the cathode of the valve 41 and the junction of the capacitor 16 with resistor 14. In Figure 5 the modification consists of the connection of a third rectifier 53 between the cathode of the valve 40 and the junction of the capacitor 16 with the resistor 14. In the arrangements of Figures 4 and 5 the time taken for the oscillator to stop is shorter than that when the arrangement of Figure 3 is used.

A simple control circuit employing a mechanical relay is shown in Figure 6. On the application of a start signal to the terminals 44 and 45 contacts 54 and 55 close and connect a battery 56 of low internal resistance between the terminals 19 and 20.

Figure 7 shows a modification of the arrangement of Figure 1, the valve 10 not being shown. In the arrangement of Figure 7 oscillations are stopped by open-circuiting the regenerative feedback circuit. This is achieved by a relay 57 whose winding is connected between the terminals 44 and 45. The moving contact 58 of the relay is normally held in engagement with a fixed contact 59 which is connected to the positive pole of a battery 60 whose negative pole is earthed. The capacitor 15 becomes charged therefore from the battery 60. When a start signal is applied to the terminals 44 and 45 the relay becomes energised and the moving contact 58 comes into engagement with the fixed contact 61 which is connected to the anode. A further relay 62 is also provided, the winding of this relay being connected between the terminals 44 and 45. The terminal 21 is connected to the moving contact 63 of the relay 62 which is normally held in engagement with a fixed contact 64 connected to the positive pole of a battery 65 whose negative pole is earthed. When a start signal is applied to the terminals 44 and 45 the relay 62 becomes energised and the contact between the contacts 63 and 64 is broken. The batteries 60 and 65 serve to establish the datum potential between the output terminals 22 and 23 during stop periods.

I claim:

1. A start-stop oscillator responsive to a start signal abruptly to start oscillating and responsive to a stop signal abruptly to stop oscillating, the said start-stop oscillator comprising a resistance-capacity oscillator including an electron discharge valve amplifier and a resistance-capacity phase-shift network connected between the output and input of said amplifier to provide frequency-determining regenerative feedback, and control means for controlling the amount of said regenerative feedback, said control means including two further electron discharge valves, a resistive impedance in the cathode lead of each of said further valves, means coupling the anode of each of said further valves to a control electrode of the other, two output terminals, a rectifier device connecting the cathode of one of said further valves to one of said output terminals, a second rectifier device connecting the cathode of the other of said further valves to the other of said output terminals, said output terminals being connected across at least a part of said network, and an input terminal for applying said start and stop signals to a control electrode of one of said further valves to alter the conductivity of said rectifier devices.

2. A start-stop oscillator responsive to a start signal abruptly to start oscillating and responsive to a stop signal abruptly to stop oscillating, the said start-stop oscillator comprising two electron discharge valves, two impedance elements connected to the anodes of said valves respectively to provide a push-pull output voltage, a frequency-determining, regenerative feedback comprising a resistance-capacity phase-shift network coupled between the anodes of said valves and control electrodes thereof, and control means for controlling the amount of said regenerative feedback, said control means including an electrically-operated switch device and means to apply said start and stop signals to operate said switch device, said switch device being connected to said network to render said network operative in response to said start signal and inoperative in response to said stop signal.

3. A start-stop oscillator as claimed in claim 2, wherein cathode-follower circuits are provided between the anodes of said valves and said network.

4. A start-stop oscillator as claimed in claim 2, and comprising a further push-pull amplifier means having the input thereof connected to said network to provide a push-pull output voltage in phase quadrature with the first said push-pull output voltage.

5. A start-stop oscillator responsive to a start signal abruptly to start oscillating and responsive to a stop signal abruptly to stop oscillating, the said start-stop oscillator comprising a multi-stage electron tube amplifier, a resistance-capacity network connected between the output and input of said amplifier and providing a regenerative feedback for generating sustained oscillations in said amplifier, said network determining the frequency of said oscillation and including a first resistance element and a condenser connected in series in a circuit path energized by the plate circuit of one stage of said amplifier, a second resistance and a second condenser connected in series in a second path connected in shunt to said first resistance, a connection from the mid-point of said second path to the control electrode of another stage of said amplifier, separate output circuits effectively connected across said second condenser and said second resistance respectively, a switch device connected to establish a third path around at least a portion of said first resistance element and normally preventing oscillation of said amplifier, and means controlled by said start-stop signals for operating said switch device and being responsive to a start signal to interrupt said third path and responsive to a stop signal to complete said third path.

References Cited in the file of this patent
UNITED STATES PATENTS

| | | |
|---|---|---|
| 2,268,872 | Hewlett | Jan. 6, 1942 |
| 2,346,396 | Rider | Apr. 11, 1944 |
| 2,444,084 | Artzt | June 29, 1948 |
| 2,456,016 | Owen | Dec. 14, 1948 |
| 2,459,822 | Lalande | Jan. 25, 1949 |
| 2,540,478 | Frost | Feb. 6, 1951 |
| 2,554,308 | Miller | May 22, 1951 |
| 2,562,450 | De Lano | July 31, 1951 |